Patented Nov. 27, 1928.

1,693,204

UNITED STATES PATENT OFFICE.

EMIL LÜSCHER AND HEINRICH STEIGER, OF BASEL, SWITZERLAND, ASSIGNORS TO THE FIRM: ELEKTRIZITÄTSWERK LONZA, OF GAMPEL AND BASEL, SWITZERLAND.

PRODUCTION OF METALDEHYDE.

No Drawing. Original application filed June 10, 1925. Serial No. 36,278, and in Germany June 23, 1924. Divided and this application filed July 22, 1926. Serial No. 124,288.

This application is a division of application Ser. No. 36,278 filed June 10, 1925, Patent No. 1,612,032.

The metaldehyde produced according to the U. S. Letters Patent No. 1,555,223 from metal salts and acids and pressed into cakes or press bodies is generally covered some time after lighting by a fine grey to black coating, which hinders the combustion of the block. Research has now shown that the cause of this difficulty is to be found in the residue of the catalyst still remaining in the finished product, although the incombustible residue of the catalyst exists in the metaldehyde only in extremely small quantity, at most a few thousandths per cent, and consequently cannot by itself alone produce so much troublesome ash. It has also been found that several inorganic residues although contained in much larger quantities in the metaldehyde do not affect the combustion to a noticeable degree.

It follows therefore that this catalyst residue produces by-products by contact reaction, which during the combustion, especially with insufficient air supply, causes the formation of carbonaceous slag films on the metaldehyde block, which after the combustion have a dry or grey appearance. These difficulties cannot be removed by a further purification of the metaldehyde, because that would involve almost insuperable difficulties.

We have now discovered that these difficulties do not occur or only occur to a very slight extent if in the production of metaldehyde from acetaldehyde, substances are used as catalysts which during the combustion process evaporate, burn themselves or are separated into their constituent parts, which do not act prejudicially on the unburnt metaldehyde and which at the same time, especially with the use of an excess of acid according to the aforesaid patent, quickly furnished a very good yield of metaldehyde, especially if the catalyst and the acetaldehyde are both used in as waterfree a condition as possible. To this type of catalyst belong salts which result from the action of strong acids on inorganic nitrogen bases, for example: ammonium bromide, hydrazine chloride and hydroxylamine.

The catalyst can be added in the form of a neutral or acid salt, or can itself be produced in the reacting material, the acetaldehyde being first treated with the base and then with the necessary quantity of acid.

What we claim is:

A process for the production of metaldehyde which burns practically free from soot and ash, consisting in treating acetaldehyde with such catalyzer salts that result from the action of strong acids on inorganic nitrogen bases.

In witness whereof we have hereunto signed our names this 7th day of July, 1926.

EMIL LÜSCHER.
HEINRICH STEIGER.